UNITED STATES PATENT OFFICE.

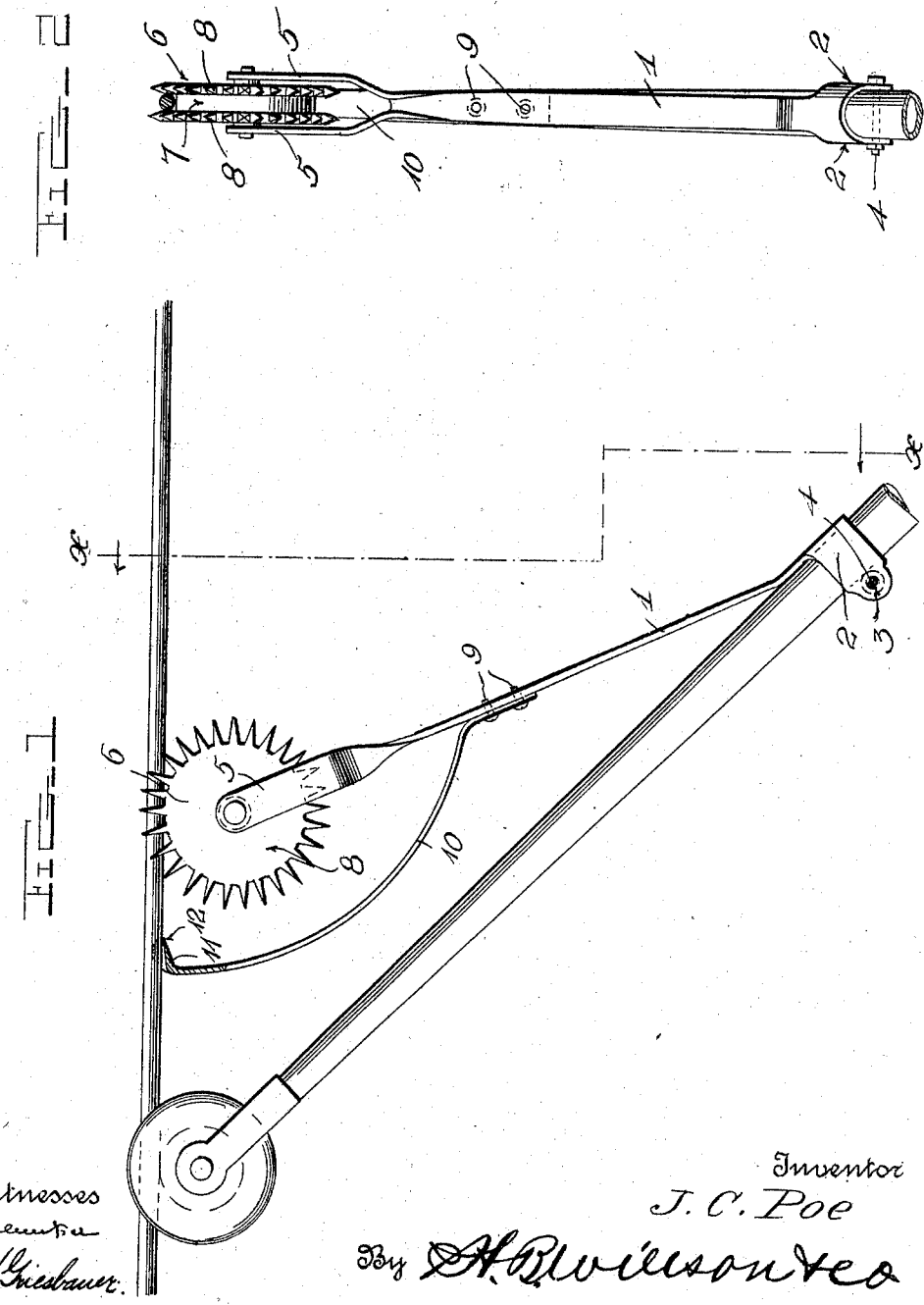

JAMES C. POE, OF ROSEDALE, KANSAS, ASSIGNOR OF ONE-HALF TO C. M. BURDETT AND A. CHAMP, OF KANSAS CITY, MISSOURI.

ICE-CLEANER FOR TROLLEY-POLES.

967,051.   Specification of Letters Patent.   Patented Aug. 9, 1910.

Application filed September 23, 1909. Serial No. 519,280.

*To all whom it may concern:*

Be it known that I, JAMES C. POE, a citizen of the United States, residing at Rosedale, in the county of Wyandotte and State of Kansas, have invented certain new and useful Improvements in Ice-Cleaners for Trolley-Poles; and I do declare the following to be a full, clear, and exact description of the invention, such as will enable others skilled in the art to which it appertains to make and use the same.

My invention relates to cleaning devices for trolley wires and particularly to devices of this character for scraping the ice from the wires so as to enable the trolley wheel to obtain a good contact.

With the foregoing and other objects in view, the invention consists of certain novel features of construction, combination and arrangement of parts, as will be more fully described and particularly pointed out in the appended claim.

In the accompanying drawings, Figure 1 is a side elevation of the device applied to a trolley pole; Fig. 2 is a front view looking in the direction of the arrow.

Referring more especially to the drawings, 1 represents an arm which is provided at its lower end with attaching members 2 formed integral therewith and provided with bolt receiving apertures 3 adapted to receive attaching bolts 4 which clamp the device upon the trolley pole. This arm extends outwardly along the trolley pole slightly diverging therefrom to its outer end where it is provided with a bifurcated wheel receiving harp 5 between the legs of which is joined an ice breaking wheel 6. This wheel is provided with a central annular groove 7 to receive the trolley wire and is defined by a pair of rims 8 which are notched to form breaking teeth. These teeth closely engage the trolley wire and break the ice thereupon up into small fragments so that it may be readily scraped away by the scraper which I shall now describe.

Secured to the back of the arm 1 by bolts 9 is a spring arm 10 which extends substantially upon the arc of a circle around the wheel 6 to a point upon a horizontal line with the top of the roller where it is bent at right angles as at 11 to form a cutting or scraping member 12. This member is suitably grooved to receive a trolley wire and is sharpened at its upper edge so that it will cut the ice upon the wire when it is not loose enough to scrape away.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

I claim as my invention:—

An ice cleaner for trolley poles, comprising a resilient arm bifurcated at its upper end to form a fork and provided at its lower end with means for attachment to a trolley pole, a wheel journaled to the bifurcated end, said wheel having peripheral tooth rims and an intermediate groove to receive the trolley wire and a curved resilient scraper secured to the resilient arm and projecting upwardly and provided with a bent end formed with a groove and a sharpened edge, substantially as shown and described.

In testimony whereof I have hereunto set my hand in presence of two subscribing witnesses.

JAMES C. POE.

Witnesses:
 CLARA S. MADDUX,
 ELLA BARRY.